May 8, 1923.
C. E. BOWN
GREASE GUN
Filed May 1, 1920
1,454,574
2 Sheets-Sheet 1
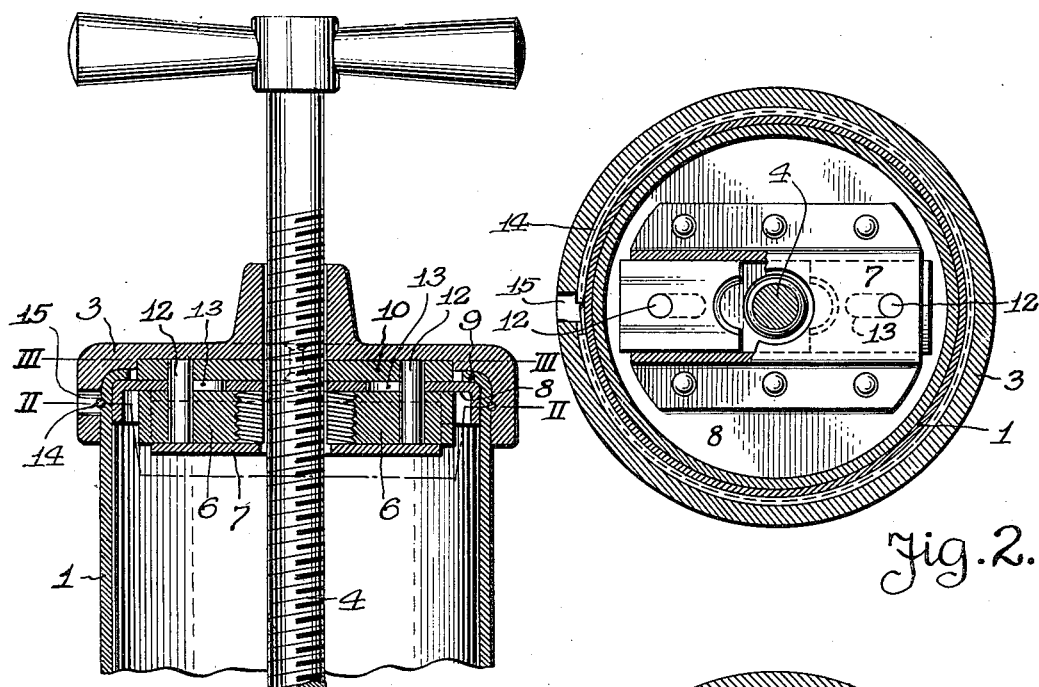
Fig. 2.
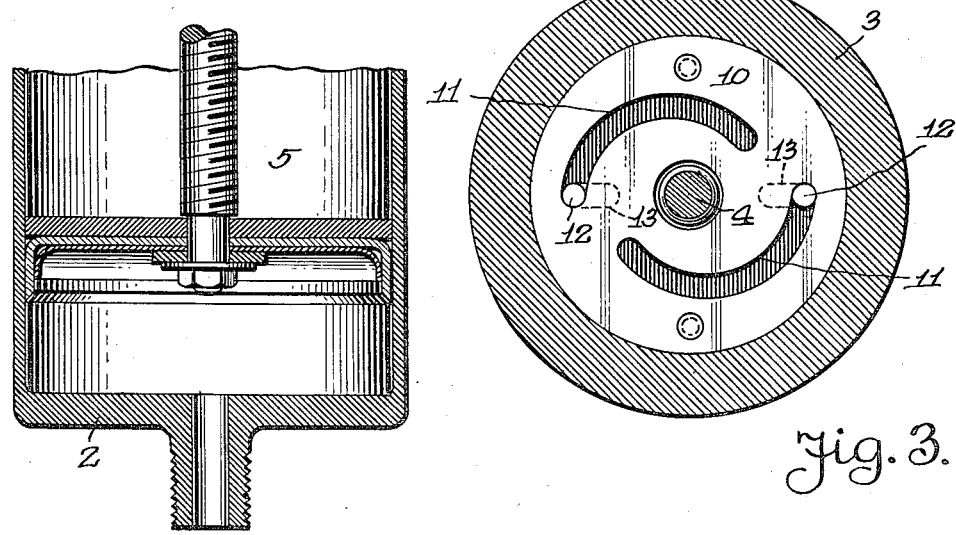
Fig. 1.
Fig. 3.
Inventor
Charles E. Bown,
By
Attorneys May 8, 1923. 1,454,574
C. E. BOWN
GREASE GUN
Filed May 1, 1920 2 Sheets-Sheet 2
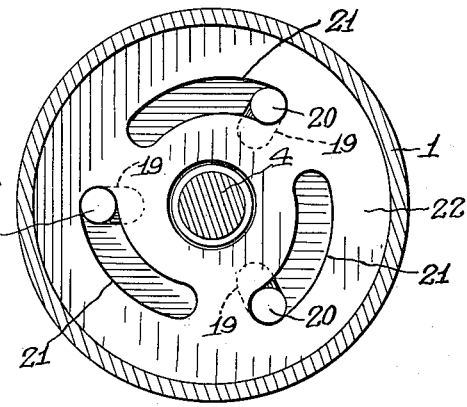
Fig. 5.
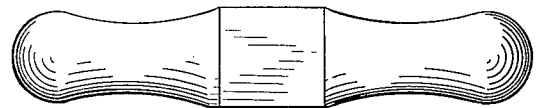
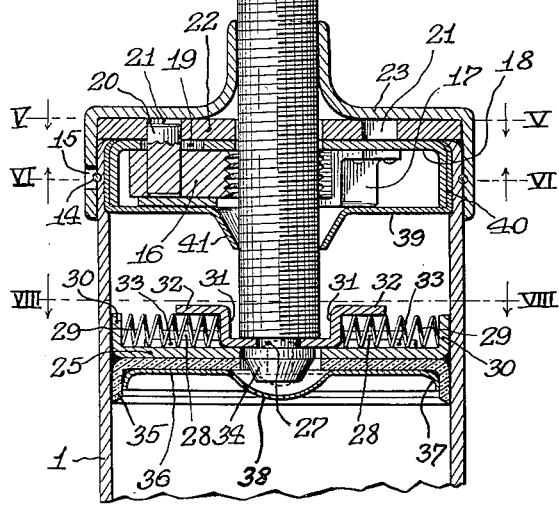
Fig. 4.
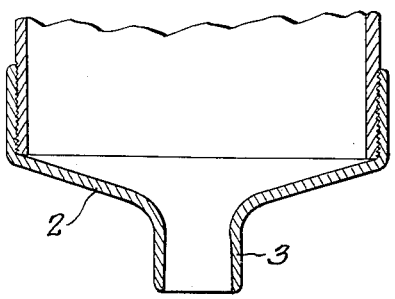
Fig. 6.
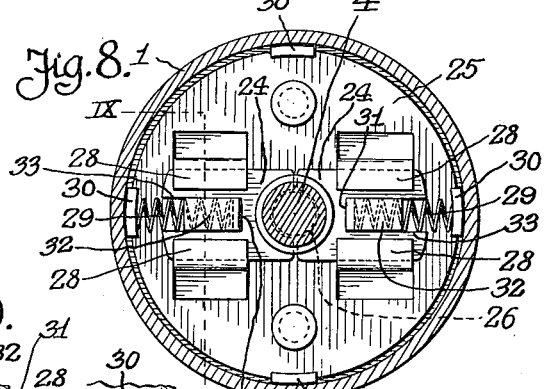
Fig. 8.
Fig. 9.
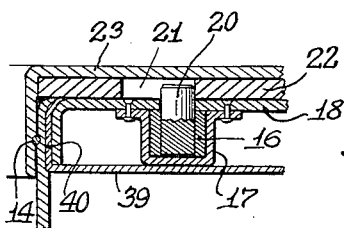
Fig. 7.
Inventor
Charles E. Bown,
By
Attorney Patented May 8, 1923.

1,454,574

UNITED STATES PATENT OFFICE.

CHARLES E. BOWN, OF DAYTON, OHIO.

GREASE GUN.

Application filed May 1, 1920. Serial No. 378,209.

*To all whom it may concern:*

Be it known that I, CHARLES E. BOWN, a citizen of the United States of America, residing at Dayton, in the county of Montgomery and State of Ohio, have invented certain new and useful Improvements in Grease Guns, of which the following is a specification, reference being had therein to the accompanying drawings.

This invention relates to a device including a cylinder and a piston or plunger operated by a rod or stem passing through an end or head of the cylinder, and more particularly to a hand operated device of this character for forcing a fluid or semi-fluid from the cylinder under heavy pressure.

In order to place the contents of such a cylinder under heavy pressure with the expenditure of a minimum of effort on the part of the operator, the operating rod or stem is usually screw-threaded to engage a screw-threaded opening in the cylinder head so that by turning the stem the piston is moved in the cylinder to put pressure on its contents and force the same through a discharge opening in the opposite end or head, but when the piston has reached the discharge end of the cylinder it is necessary to reverse the direction of rotation of the stem to retract the piston in order that the cylinder may be refilled and this is a slow and tedious operation. Further, when the cylinder is full the stem will project therefrom to a considerable distance, thus making the overall length of the device so great that it is cumbersome to carry about and the stem is liable to be bent or otherwise injured.

An object of this invention is to provide a device of the character described with means whereby the screw-threaded rod or stem may be released from engagement with the thread on the cylinder head so that the piston may be expeditiously retracted by a non-rotative endwise movement of the stem, and further to make a stem detachable from its piston so that it may be readily removed from the cylinder when desirable and the overall length of the device thus reduced for the sake of compactness in carrying and to guard against injury to the stem. And a further object is to provide a very simple construction so arranged that the same may be quickly operated to release the stem from screw-threaded engagement with the cylinder head and whereby the detachment of the stem from the piston is made semi-automatic.

It is also an object of the invention to provide a construction wherein all of the movable parts of the releasing mechanism are housed within the cylinder and thus protected against injury, and whereby the device presents a very neat appearance.

With the above and other ends in view, the invention consists in the matters hereinafter set forth and more particularly pointed out in the appended claims, reference being had to the accompanying drawing in which—

Figure 1 is a longitudinal axial section through a device illustrative of features of the invention;

Fig. 2, is a transverse section through the same substantially upon the line II—II of Fig. 1;

Fig. 3 is a similar section upon line III—III of Fig. 1;

Fig. 4 is a view similar to Fig. 1 showing modifications and additional features in the construction;

Fig. 5 is a transverse section substantially upon the line V—V of Fig. 4;

Fig. 6 is a transverse section substantially upon the line VI—VI of Fig. 4;

Fig. 7 is a sectional detail taken substantially upon the line VII—VII of Fig. 6;

Fig. 8 is a transverse section substantially upon the line VIII—VIII of Fig. 4, and Fig. 9 is a sectional detail substantially upon the line IX—IX of Fig. 8.

As shown in Figs. 1 to 3 inclusive, 1 indicates a cylinder having a closed lower end 2 provided with a nipple having a discharge passage therethrough. The opposite end of the cylinder is closed by a rotatable cap 3 having an axial opening through which a screw-threaded stem 4 freely passes. This stem is attached in any suitable manner at its inner end to a piston 5 and within the upper end of the cylinder adjacent the cap 3, are blocks 6 which, together form a nut having screw-threads to engage the screw-threaded stem. These blocks are arranged to slide longitudinally toward and from the stem into and out of engagement therewith by being placed within a guide 7 which is formed of sheet metal to provide a channel way extending transversely of the cylinder and this guide is supported in position within the upper end of the cylinder by means of a head 8 which fits closely within the upper end of the cylinder and is secured in place by inturning the upper edge of the cylinder wall over the edge of the head as shown at 9, and the sheet metal channel 7 is riveted or otherwise secured to this head 8 so that the two blocks or halves of the nut are held in place and guided in their movement toward and from each other and into and out of engagement with the stem 4. To move the blocks 6 in their guide way simultaneously toward or from each other, a plate or disk 10 is welded or otherwise secured within the cap 3 against the underside thereof and in this disk is formed cam slots 11 arranged eccentric to the axis of the cylinder and stem 4. A pin 12 carried by each block or nut part 6 extends upwardly through radial slots 13 in the head 9 and into the cam slots 11 in the disk 10.

The cap 3 being rotatable upon the end of the cylinder and the disk 10 being secured to and carried thereby, upon rotation of the cap, the blocks 6 will be moved in their guides 7 by reason of engagement of the pins 12 on the blocks with the cam slots 11 in the plate 10 and thus, whenever it is desired to release the screw-threaded stem 4 so that it may be moved longitudinally to move the piston without the necessity for rotating the stem, it is only necessary for the operator to grasp the cap 3 and turn it in the proper direction to move the two parts of the nut or blocks 6 away from the stem and out of engagement therewith, thus relieving the screw-threads on the stem from engagement with the screw-threads on the blocks and permitting free longitudinal movement of the stem.

To hold the cap 3 in position upon the end of the cylinder and yet permit it to turn freely thereon, a groove is formed in the outer surface of the cylinder wall and a like groove in the adjacent inner surface of the flange of the cap. Into these grooves is run a wire 14 by providing an opening 15 in the flange of the cap, engaging one end of the wire in the groove and then running it endwise therein around the entire cylinder. The wire lying one-half in the groove in the cylinder wall and the other half in the groove in the flange of the cap, locks the cap securely in position upon the end of the cylinder but permits its free rotation thereon.

In the construction shown in Figs. 4 to 9 inclusive, the mechanism for releasing the stem 4 is modified in that the divided nut is shown as comprising three separate blocks 16 provided with inner screw-threaded ends to engage the stem and separately guided in guide ways 17 which are riveted or otherwise secured to a plate or head 18 rigidly secured within the end of the cylinder.

This head 18 is provided with slots 19 extending radially toward the axis of the stem and each block 16 or nut part is provided with an upwardly extending pin 20 passing through the adjacent slot 19 and into a cam slot 21 formed in a plate or disk 22 secured within the rotatable cap 23 on the end of the cylinder.

As in the previously described construction, a rotation of the cap 23 rotates the disk 22 and by reason of the eccentric arrangement of the slots 21 in the disk and the engagement therewith of pins 20 carried by the nut blocks 16, the blocks are moved radially toward or from the stem to engage or disengage the threads on the nut parts with the threads on the stem. To release the inner end of the stem 4 from the piston 5, suitable locking mechanism is provided for locking the stem to the piston which locking mechanism may be operated when desired to release the stem so that the stem may be removed from the cylinder and again engaged with the piston to operate the same when desired. This locking mechanism comprises a pair of oppositely disposed locking jaws 24 which are mounted upon the upper side of the disk or plate 25 forming the body of the piston. These jaws each comprise a plate formed with a notch 26 in one end to engage an annular groove 27 formed in the stem 4 near its lower end. These jaws are guided to move radially toward and from the stem by striking up portions of the plate 25 to form flanges 28 which are bent upwardly and over the edges of the plates forming the jaws. These guides for the jaws are preferably formed as described but it will be understood that any other suitable form of guide made integral with or secured to the plate 25 may be employed.

The jaws 24 are normally yieldingly held or urged toward the stem by means of coiled springs 29 interposed between lugs 30 formed integral with the periphery of the plate 25 and turned upwardly therefrom to engage the wall of the cylinder 1. These lugs 30 not only form abutments for one end of each spring 29 but also serve as guides for the piston 5 in the cylinder, preventing the piston from tilting and binding within the cylinder. Abutments for the inner ends of the springs 29 are formed by striking up portions of the jaws 24, as shown at 31, and then bending the upper ends of the struck up portions longitudinally of the spring to form guide portions 32 extending over and parallel with springs to hold the same in place within the groove 33 in each plate or jaw 24 formed by striking up of the abutment 31 and guide arm 32 from the plate.

The portion of the stem 4 below the groove 27 is tapered to form a conical head 34 on the end of the stem and the plate 25 is formed with an axial opening and through which this head 34 projects when the piston is attached to the stem by means of locking jaws 24 engaging the groove 27. The usual cupped leather 35 is secured to the underside of the plate 25 and to hold this cupped leather securely in place with its annular downwardly extending flanged edge in contact with the wall of the cylinder, a thin sheet metal plate 36 is secured against the underside of the leather washer 35, said thin metal plate 36 being formed with a down-turned annular edge portion 37 adapted to engage the inner side of the flange of the cupped washer to hold this flange in firm contact with the wall of the cylinder. The washer 35 is also formed with an axial opening through which the head 34 extends and the plate 36 is formed at its axis with a downwardly extending concavo-convex protuberance 38 which forms a closure for the openings in the washer 35 and plate 25 and also forms a chamber within which the head 34 on the stem is enclosed.

This plate 36 prevents the contents of the cylinder below the piston from passing through the central opening in the piston which receives the head on the stem.

A thin metal disk 39 having an upturned rim flange 40 is secured in the upper end of the cylinder by interposing the flange 40 between the cylinder wall and the inner head or disk 18, the edge of the upper end of the wall of the cylinder being inturned over the edge of this flange and the shoulder of the head 18 to firmly secure the parts in place. The disk 39 extends across the cylinder adjacent the guides 17 and thus forms a chamber in the upper end of the cylinder for the blocks or nut parts 16, and adjacent the stem 4 this plate 39 is formed with a downwardly extending conical portion 41 surrounding the stem and the purpose of this conical flange surrounding the opening through which the stem extends, is to engage the abutments 31 of the slides or jaws 24 when the piston is moved to the upper end of the cylinder, and move these jaws outwardly against the action of the springs 33 to disengage their inner ends from the groove 27 in the stem and thus release the stem from the piston. The conical form of flange 41 permits its lower end to enter between the stem and abutments and as the piston is moved upwardly the inclined surface of the flange will spread the jaws apart and release them from the groove, and the stem may then be pulled out through the upper end of the cylinder after the nut members 16 have been withdrawn from engagement with the threads on the stem.

By enclosing the movable nut blocks within a rotatable cap and providing means operated by a rotation of the cap for moving these blocks, the entire mechanism for releasing the threads of the nut from the threads on the stem is enclosed within a small space in the upper end of the cylinder and this mechanism is operated by a simple turning movement of the cap and there are no projecting levers or other members to become bent or broken in handling the device and it presents an external appearance which is not materially different from the ordinary grease gun. Further, the mechanism is very simple and efficient in operation and not liable to get out of order.

By providing means for detachably connecting the stem to the piston, the stem may be removed from the cylinder when desired and this is particularly desirable when the cylinder is nearly full of grease as the stem, if left in place, would project from the cylinder a considerable distance, making the over-all length of the device too great for convenience in carrying in the ordinary tool box provided for the purpose. By providing means at the upper end of the cylinder for engaging and operating the locking jaws which hold the stem attached to the piston, the stem is automatically disconnected by drawing the piston to the extreme upper end of its movement within the cylinder and thus the connecting and disconnecting of the stem is accomplished quickly and without effort.

Obviously, changes may be made in the size and proportion of parts or their arrangement without departing from the spirit of the invention and within the scope of the appended claims and I do not, therefore, limit myself to the construction or arrangement shown.

What I claim is:—

1. In combination with a cylinder, a piston in the cylinder and a screw-threaded member for operating the piston, of screw-threaded means for engaging the screw-thread of the operating member adapted to be moved out of engagement therewith to release the same, means for detachably connecting the inner end of the operating member with the piston, and means within the cylinder for moving said connecting means out of engagement with said operating member to release the operating member from the piston.

2. In combination with a cylinder, a piston in the cylinder, and a formed stem for operating the piston, of a member movable radially of the axis of the stem into and out of engagement therewith to operatively connect the stem with the cylinder, and means for operating said member comprising a rotatable cap for closing the end of the cylinder.

3. In combination with a cylinder, a piston in the cylinder, and a screw-threaded stem for operating the piston, of a divided nut to engage the stem, a cap on the cylinder for closing the end thereof, and means operated by a rotation of the cap for moving the parts of the divided nut into and out of engagement with the stem.

4. The combination of a cylinder, a rotatable cap for closing the end of the cylinder, a piston in the cylinder, a screw-threaded stem for operating the piston extending through the cap, means secured against rotation within the closed end of the cylinder having screw-threads to engage the screw-threaded stem, and means operated by the rotation of said cap for moving the screw-threaded means into and out of engagement with the screw-threaded stem.

5. The combination of a cylinder, a head fixed thereon and provided with radial slots, a piston in the cylinder, a screw-threaded stem for operating the piston extending through the head, guides on the inner side of the head, members slidable in said guides and provided with screw-threads to engage the screw-threaded stem, pins on said members extending through the slots in the head, and a freely rotatable cap positioned externally of the head to close the end of the cylinder and provided with eccentric slots adapted to be engaged by said pins.

6. The combination of a cylinder, a fixed head in one end of the cylinder, said head being provided with radial slots and a central opening, a piston in the cylinder, a screw-threaded stem extending through the control opening in the head for operating the piston, nut members carried by said head and movable radially into and out of engagement with the stem, a cap freely rotatable upon and closing the end of the cylinder and inclosing the head and having slots in the inner side thereof formed eccentric to its axis of rotation, and pins in the nut members engaging said slots.

7. The combination of a cylinder, a head fixed in one end of the cylinder and provided with radial slots and a central opening, a piston in the cylinder, a screw-threaded stem for operating the piston and extending through the central opening in the head, guides secured to the inner side of the head, nut members movable in said guides toward and from the stem, a cap enclosing and rotatable upon the closed end of the cylinder, a plate within the cap rotatable therewith and provided with slots formed eccentric to the axis of rotation, and pins in the nut members extending through the slots in the head and engaging the eccentric slots in the plate.

8. The combination with a cylinder having a closed end, a piston in the cylinder, a stem for operating the piston extending through the closed end of the cylinder, of means carried by the piston for detachably connecting the inner end of the stem to the piston, and means within the cylinder adjacent the closed end thereof for operating said connecting means to release the stem from the piston.

9. The combination with a cylinder, a piston in the cylinder, and a member extending into the cylinder for operating the piston, of means for detachably connecting the operating member to the piston, and means within the cylinder for operating said connecting means for releasing said operating member from said piston.

10. The combination with a cylinder, a piston in the cylinder, and a member extending into the cylinder for operating the piston, of means for detachably connecting the operating member to the piston, and means for engaging and operating said connecting means at a point in the travel of the piston for effecting a disengagement of the operating member from the piston.

11. The combination with a cylinder closed at one end, a piston in the cylinder, and a stem for operating the piston extending through the closed end of the cylinder, of locking means carried by the piston for detachably connecting the stem to the piston, and means within the cylinder for operating said locking means to release the stem from the piston.

12. The combination of a cylinder having a head, a piston in the cylinder, a stem extending through the head for operating the piston and provided with an annular groove at its inner end, locking means carried by the piston for engaging the groove in the stem and detachably connecting the stem to the piston, and means independent of the stem for operating said locking means.

13. The combination with a cylinder having a head, a piston in the cylinder, a stem extending through the head for operating the piston, of means for detachably connecting the inner end of the stem to the piston comprising radially movable members carried by the piston to engage and lock the stem, and means for moving said members radially to effect a disconnection of the stem from the piston.

14. The combination of a cylinder having a head, a piston in the cylinder, a stem for operating the piston extending through the head and provided with an annular groove at its inner end, guides on the piston, locking members movable in said guides into and out of engagement with said groove, springs for holding the locking members engaged with the groove, and means for moving the locking members against the action of said springs to release the piston from the stem.

15. The combination of a cylinder, a piston in the cylinder having a central opening, a stem for operating the piston having an annular groove and a head at the end of the stem adapted to be received in the central opening of the piston, locking members carried by the piston and adapted to engage the groove, means for operating said locking members to release the same from the groove and a plate secured to the lower side of the piston and covering the opening therein and the head of the stem.

16. The combination of a cylinder having a head, a piston in the cylinder, a stem for operating the piston extending through the head, said stem having an annular groove at its inner end, guides on the upper side of the piston, locking members slidable in said guides into engagement with said groove, springs for moving the locking members in the guides into engagement with the groove, and means adjacent the head of the cylinder for engaging the locking members and moving the same against the action of the springs when the piston is moved toward the head of the cylinder.

In testimony whereof I affix my signature in the presence of two witnesess.

CHARLES E. BOWN.

Witnesses:
FRANK L. WALKER,
HARRY F. NOLAN.